3,035,695
ARRANGEMENT TO SEPARATE PILED FLAT ARTICLES FROM EACH OTHER

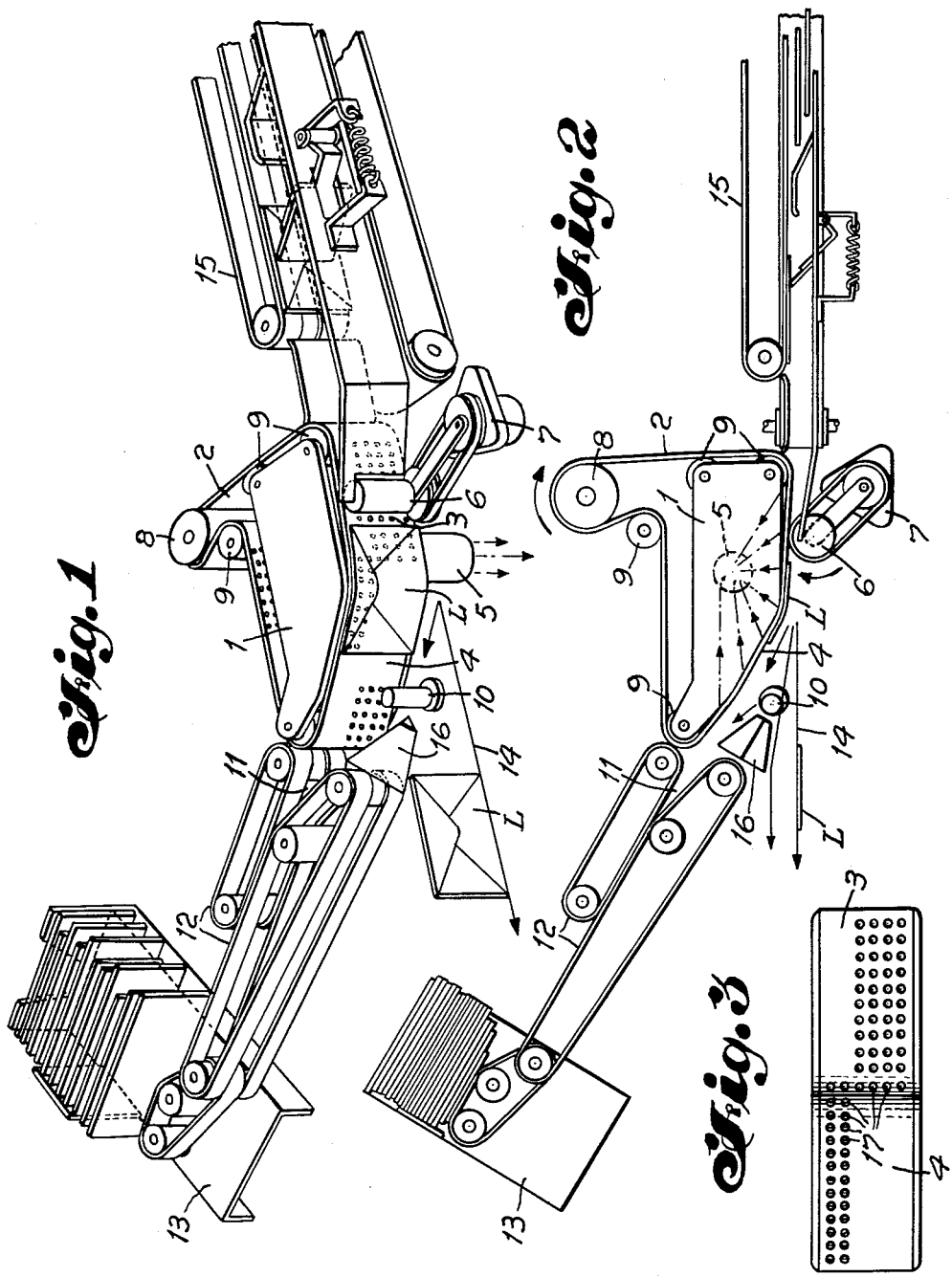

Fritz Buchwald and Horst Fliegner, Berlin-Lankwitz, Germany, assignors to International Standard Electric Corporation, New York, N.Y., a corporation of Delaware
Filed July 13, 1959, Ser. No. 826,612
Claims priority, application Germany July 31, 1958
1 Claim. (Cl. 209—82)

This invention relates to article sorting and more particularly to sorting of flat articles from a pile thereof. In particular this arrangement is to separate from each other legendized or inscribed papers such as post letters and cards and to deliver these papers to a conveying system or to equipment by which the papers are to be further treated.

It is known from the prior art to suck articles against an endless perforated belt which is moved with its perforations over a suction nozzle that extends so far in the direction of motion of the belt that the respective article, sucked against the belt, is conveyed with safety to an appliance arranged to process it in some way. In prior art devices the suction nozzle was divided in two parts which parts were connected to two suction ducts which were independent of each other and of which one part sucked the article against the belt while the other held the article against the belt during conveyance.

In postal service, for which these arrangements are intended primarily, the articles to be conveyed have dimensions and properties very different among themselves. But since in the case of certain processing appliances for the articles a predominantly uniform size and state of these will be advantageous in respect of economy and reliability of service, and will, under certain circumstances, even be necessary. The mail pieces should be sorted as to dimension and other properties before being delivered to these treating appliances, such as letter-positioning and stamping devices.

The arrangement according to the present invention tests the articles as to stiffness and in respect of a minimum size, and eliminates from the conveying path any articles inconsistent with predetermined requirements. For this purpose the invention utilizes an arrangement wherein the suction is effective through two variably perforated walls which are fitted together at obtuse angles and over which an endless perforated belt passes. The included angle between these two walls should be about 150°.

In order to accomplish sorting as to stiffness and in respect of a minimum size of the articles, the perforations or holes in the first wall, as viewed in the direction of conveyance, are larger in number than those in the second wall. Since the articles, in order to remain in contact with the suction belt, must, when passing from one wall to the other, be bent through an angle of substantially 30°, the suction necessary to effect this bending will be sufficient for those articles for which the bending effect is either equal to or less than the predetermined value.

Considerations similar to these apply to the sorting as to size. For this purpose the holes in the first wall are disposed in superposed rows, the lowest row being near the lower edge of this wall, whereas the holes in the second wall are only in some upper rows, so none but such articles shall be passed on by the belt part running along this second wall, as are of sufficient height to reach these upper rows of holes. Articles of less height will not be sucked toward this second wall with the aid of the belt and can hence leave the conveying path by the aid of an additional conveyor and of guide means at the inlet to this conveyor.

The arrangement according to the invention is not only suitable for pulling off the articles from a pile thereof but may also be furnished with articles supplied to it irregularly. For this purpose there is disposed at the inlet of the arrangement, and parallel to the suction belt, a roller which, being spaced at a small distance from this belt, is driven in the direction the reverse of that in which the belt is circulating, and which provides that each time but a single article shall be seized by the suction belt.

The above-mentioned and other features and objects of the invention and the manner of attaining them will become more apparent and the invention itself will be best understood by reference to the following description of an embodiment of the invention taken in conjunction with the accompanying drawings in which:

FIG. 1 is a perspective view of one embodiment of the invention;
FIG. 2 is a diagrammatic plan view thereof,
FIG. 3 is a detail view illustrating the distribution of the holes in the two suction walls.

Referring now to FIGS. 1, 2 and 3, there is shown a hollow chamber that has two plane side walls 3, 4 which inside body 1 form an angle of about 150°. A perforated endless belt 2 is arranged to circulate past suction holes 17 in these walls. The walls 3, 4, with the suction holes are shown separately in FIG. 3. As represented by way of example, wall 3 has four horizontal rows of holes, each row containing eleven such holes, and wall 4 has two horizontal rows of fourteen suction holes each. The two rows of holes in wall 4 are at a higher level than the four rows in wall 3. Wall 3 is situated ahead of wall 4, as viewed in the direction of conveyance. The first four suction holes in wall 3 and the last two suction holes in wall 4 are in vertical alignment and constitute a row in order to facilitate the conveyance of the article past the vertical edge common to the walls 3, 4. The perforation of belt 2 is similar to the arrangement of the vertical row of suction holes in the walls 3, 4. These holes need not correspond in shape and number exactly to the perforations in belt 2, but certain suction holes in the walls may correspond to several holes in the belt.

The hollow chamber 1 is joined by a pipe 5 to a source of air suction (not shown). More than one such source may be arranged to provide for suction effects different from each other.

A roller 6 serves to facilitate the process of separating the articles from each other and is rotated by a drive mechanism 7 in the direction contrary to the direction of conveyance. The perforated or suction belt 2 is driven by a roller 8 and guided by rollers 9. An eccentric roller 10 and a frustro-tetrahedron-shaped device 16 are arranged in front of a conveying channel 11 in order to act as guide aids for articles. This channel is formed by a pair of belt conveyors 12 and leads into a stacking device 13. Articles, such as letters, not complying with certain requirements are conveyed in the direction of arrow 14 into separate receptacles, as, for example, by a conveying equipment similar to the conveyors 12. The letters are introduced into the described system by an edgewise acting conveyor that comprises a belt 15 and suitably arranged vertical guide means for the letters.

The arrangement described above operates as follows: The direction of rotation of roller 6 is opposite to the direction of movement of the belt 2 so that a single letter L shall be seized by the suction belt 2. The letter will be sucked against this belt, which is moving around the chamber or suction head 1. That run of belt 2 which runs along the suction walls 3, 4 moves the letter toward the channel 11. At the vertical edge formed by the walls 3, 4 the belt 2 by the suction effective through its perforations attempts to bend the letter round this edge. If this attempt is successful, the letter will be conveyed by belt 2 into the channel 11. But if the suction does not suffice to bend the letter, either because the letter is of a size too small to be held by the suction of wall 4, or because the letter is too stiff to negotiate the curve around the wall edge, this letter will be delivered into the direction of arrow 14. Letters which are of sufficient stiffness so as not to make a complete bend at the junction between surfaces 3 and 4 are guided either into channel 11 or direction 14 depending on which side of the eccentric roller they pass. The device 16 is arranged to aid in this respect. Thus the invention performs the dual function of discriminating between articles of predetermined dimensions (height) and of another characteristic (stiffness).

While we have described above the principles of our invention in connection with specific apparatus, it is to be clearly understood that this description is made only by way of example and not as a limitation to the scope of our invention, as set forth in the objects thereof and in the accompanying claim.

What is claimed is:

A sorting apparatus to separate articles according to their height and stiffness comprising a suction chamber having a source of suction connected thereto, said chamber comprising first and second imperforate walls disposed at an angle with respect to each other, said first wall having a first group of suction holes extending therethrough and placed below a predetermined level along the length of said first wall, a second wall having a second group of suction holes extending therethrough and placed above said predetermined level along the length of said second wall, the holes in both said groups at the point of connection of said walls being in alignment in a direction normal to said predetermined level, first and second discharge paths in alignment with said walls, means for conveying articles past said first wall whereby those articles of a stiffness equal to or less than a predetermined stiffness and of sufficient height to extend above said predetermined level will be conveyed past both said first and second walls to said first discharge path and those articles having a stiffness greater than a predetermined stiffness or a height less than said predetermined level will be conveyed to said second discharge path.

References Cited in the file of this patent

UNITED STATES PATENTS

| | | |
|---|---|---|
| 2,905,309 | Makrides | Sept. 22, 1959 |
| 2,941,653 | Kriemelmeyer | June 21, 1960 |